(12) United States Patent
Chen

(10) Patent No.: US 7,812,450 B2
(45) Date of Patent: Oct. 12, 2010

(54) ELECTRODE WITH NANO-SIZED STRUCTURES

(75) Inventor: Ga-Lane Chen, Fullerton, CA (US)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 991 days.

(21) Appl. No.: 11/391,993

(22) Filed: Mar. 28, 2006

(65) Prior Publication Data

US 2006/0220769 A1    Oct. 5, 2006

(30) Foreign Application Priority Data

Apr. 2, 2005    (CN)    .................... 2005 1 0033999

(51) Int. Cl.
  H01L 23/48    (2006.01)
  H01L 23/52    (2006.01)
  H01L 29/40    (2006.01)
(52) U.S. Cl. ............... 257/739; 257/534; 257/E21.012; 257/E21.013; 438/255; 438/260; 438/398; 438/665; 438/964
(58) Field of Classification Search ............... 438/255, 438/260, 398, 665, 964; 257/534, 739, E21.012, 257/E21.013
See application file for complete search history.

(56) References Cited

U.S. PATENT DOCUMENTS

| | | | |
|---|---|---|---|
| 5,876,787 A * | 3/1999 | Avarbz et al. ................. 427/79 |
| 6,205,264 B1 * | 3/2001 | Jin et al. ........................ 385/14 |
| 6,476,409 B2 * | 11/2002 | Iwasaki et al. ................. 257/13 |
| 6,969,472 B2 * | 11/2005 | Vezenov et al. ............... 216/24 |
| 6,974,547 B1 | 12/2005 | Kohara et al. |
| 7,289,312 B2 * | 10/2007 | Duff, Jr. ....................... 361/502 |
| 7,351,607 B2 * | 4/2008 | Wang et al. .................... 438/99 |
| 2003/0228727 A1 * | 12/2003 | Guerra ........................ 438/200 |
| 2004/0175561 A1 * | 9/2004 | Duff, Jr. ................... 428/317.9 |
| 2004/0178076 A1 * | 9/2004 | Stonas et al. .................. 205/74 |
| 2005/0117194 A1 * | 6/2005 | Kim et al. .................... 359/273 |
| 2005/0205863 A1 * | 9/2005 | Choi et al. ..................... 257/40 |
| 2005/0224779 A1 * | 10/2005 | Wang et al. ..................... 257/9 |
| 2006/0214101 A1 * | 9/2006 | Takahashi et al. ........... 250/288 |
| 2006/0234396 A1 * | 10/2006 | Tomita et al. ................... 438/3 |
| 2006/0273376 A1 * | 12/2006 | Weimer et al. .............. 257/321 |
| 2006/0292312 A1 * | 12/2006 | Kim et al. .................... 427/532 |
| 2007/0053168 A1 * | 3/2007 | Sayir et al. .................. 361/718 |
| 2007/0285875 A1 * | 12/2007 | Duff, Jr. ...................... 361/502 |

FOREIGN PATENT DOCUMENTS

CN    1433358 A    7/2003

* cited by examiner

*Primary Examiner*—Matthew Smith
*Assistant Examiner*—John M Parker
(74) *Attorney, Agent, or Firm*—Jeffrey T. Knapp

(57) ABSTRACT

The present invention relates to an electrode 100 with high capacitance. The electrode includes a conducting substrate 10 with a number of nano-sized structures 13 thereon and a coating 15. The nano-sized structures are concave-shaped and are of a size in the range from 2 nanometers to 50 nanometers. The nano-sized structures are configured for increasing specific surface area of the electrode. The present invention also provides a method for making the above-described electrode. The method includes steps of providing a conducting substrate, forming a number of nano-sized structures on the conducting substrate, and forming a coating on the nano-sized structures.

16 Claims, 2 Drawing Sheets

ELECTRODE WITH NANO-SIZED STRUCTURES

BACKGROUND

1. Field of the Invention

The invention relates generally to electrodes and methods for making the same, more particularly, to an electrode having a high specific surface area thereof and a method for making the same.

2. Discussion of Related Art

In recent years, demand has been growing for more compact and thin electronic equipment, thus capacitors and batteries used in electronic equipment are also required to be thin whilst also providing high capacitance. For example, in a non-contact IC card, the thickness thereof is as thin as 1 mm or less, so the thickness of the capacitors included therein should be several hundred microns or less.

A parallel plate capacitor is one kind of conventional charge storage device. The basic design of these capacitors involves two conductive electrodes separated by a dielectric or insulative thin film material. To provide increased capacitance, one or both electrodes of the storage capacitors can be formed with a roughened surface, such as that which is provided by hemispherical grained (HSG) polysilicon, so as to increase the area over that which is provided by electrodes having planar surfaces. Other methods of providing increased capacitance involve using an insulating material having an increased dielectric constant and reducing the thickness of the dielectric insulating layer so as to reduce the distance between the electrodes.

While many variations of this type of capacitor have been developed, all of the known designs suffer from many disadvantages, having complicated structures, high construction costs and poor surface quality. Furthermore, mechanical strength becomes poorer as the capacitor becomes thinner.

What is needed, therefore, is an electrode having high capacitance and simple structure.

SUMMARY

In one aspect of the present invention, an electrode with high capacitance is provided. The electrode includes a conducting substrate with a number of nano-sized structures thereon, and a coating formed on the nano-sized structures coating The conducting substrate is comprised of a material selected from the group consisting of graphite, lithium, aluminum, copper, silver, nickel, tungsten, molybdenum and any suitable combination alloy thereof. The nano-sized structures are concave-shaped and a size of each nano-sized structure is in the range from 2 nanometers to 50 nanometers. The nano-sized structures are configured for increasing specific surface area of the electrode. The coating is formed on the nano-sized structures.

The coating is comprised of carbon nanotubes and nano-sized particles. The nano-sized particles are selected from the group consisting of indium tin oxide, chromium oxide, cobalt oxide, nickel oxide, ferric oxide, aluminum oxide, zinc oxide, silica oxide, titanium oxide and zirconium oxide, wherein x is in the range from 1 to 2; and y is in the range from 1 to 1.5.

In another aspect of the present invention, a method for making the above-described electrode is provided. The method includes the steps of:

providing a conducting substrate;

forming a number of nano-sized structures on the conducting substrate;

forming a coating on the nano-sized structures, wherein the nano-sized structures are configured for increasing a specific surface area of the electrode.

Advantages and novel features of the present invention will become more apparent from the following detailed description of preferred embodiments when taken in conjunction with the accompanying drawings.

BRIEF DESCRIPTION OF THE DRAWINGS

Many aspects of the present electrode can be better understood with reference to the following drawings. The components in the drawings are not necessarily to scale, the emphasis instead being placed upon clearly illustrating the principles of the present electrode.

Figure 1:
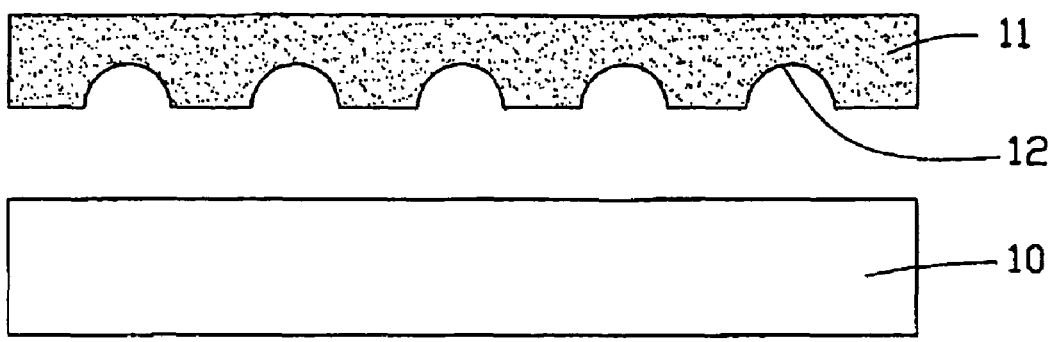
FIG. 1 is a schematic, cross-sectional view of a conducting substrate for an electrode in accordance with a preferred embodiment, together with an imprinting mold for making the electrode.

Corresponding reference characters indicate corresponding parts throughout the several views. The exemplifications set out herein illustrate at least one preferred embodiment of the present invention, in one form, and such exemplifications are not to be construed as limiting the scope of the invention in any manner.

DETAILED DESCRIPTION OF PREFERRED EMBODIMENTS

Reference will now be made to the drawings to describe embodiments of the present electrode and the method for making the same, in detail.

Figure 4:
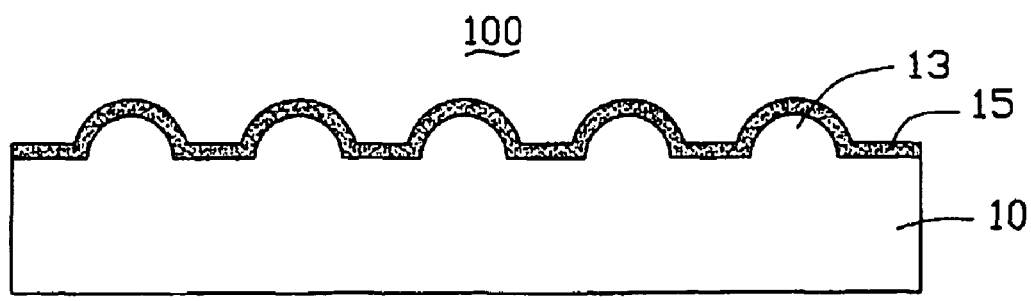
FIG. 4 is similar to FIG. 3, but showing a coating deposited on the nano-sized structures.

Referring to FIG. 4, an electrode 100 according to an exemplary embodiment is shown. The electrode 100 includes a conducting substrate 10 with a number of nano-sized structures 13 thereon and a coating 15 formed on the nano-sized structures. The conducting substrate 10 is made of a material selected from the group consisting of graphite, lithium, aluminum, copper, silver, nickel, tungsten, molybdenum and any suitable combination alloy thereof.

The nano-sized structures 13 are convex-shaped. A size of each nano-sized structure is in the range from 2 nanometers to 50 nanometers. The size of each nano-sized structure is generally in the range from 10 nanometers to 40 nanometers. The nano-sized structures 13 are configured for increasing a specific surface area of the electrode 10.

The coating 15 is formed on the nano-sized structures 13. The coating 15 is comprised of carbon nanotubes and nano-sized particles. The nano-sized particles are selected from the group consisting of indium tin oxide, chromium oxide ($CrO_x$), cobalt oxide ($CoO_x$), nickel oxide ($NiO_x$), ferric oxide ($FeO_y$), aluminum oxide, zinc oxide ($ZnO_x$), silica oxide, titanium oxide and zirconium oxide ($ZrO_x$), wherein x is in the range from 1 to 2; and y is in the range from 1 to 1.5. A thickness of the coating 15 is in a range from 1 nanometer to 20 nanometers. Preferably, the thickness of the coating 15 is in a range from 2 nanometers to 10 nm.

Figure 5:
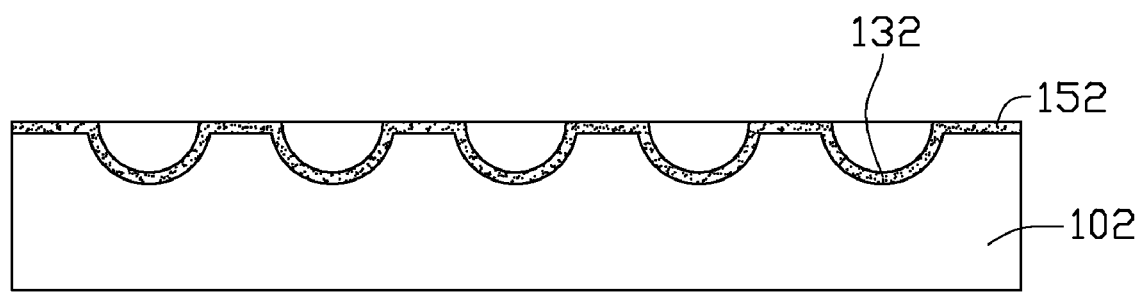
FIG. 5 is a schematic, cross-sectional view of an electrode having nano-sized structures in accordance with an alternative embodiment.

Referring to FIG. 5, an electrode 200 according to an alternative embodiment is shown. The electrode 200 includes a conducting substrate 102 with a number of nano-sized structures 132 thereon, and a coating 152 formed on the nano-sized structures 132. The main difference between the electrodes 100 and 200 is that the nano-sized structures 132 of the electrode 200 are concave-shaped.

In another embodiment, a method for making above-described electrode 10 includes the following steps in no particular order of:

providing a conducting substrate;

forming a number of nano-sized structures on the conducting substrate;

forming a coating on the nano-sized structures, wherein the nano-sized structures are configured for increasing a specific surface area of the electrode.

Referring FIG. 1, a conducting substrate 10 and an imprinting mold 11 for making the electrode 10 are provided. The conducting substrate 10 is made of a material selected from the group consisting of graphite, lithium, aluminum, copper, silver, nickel, tungsten, molybdenum and any suitable combination alloy thereof. The imprinting mold 11 is used for imprinting nano-sized structures on the conducting substrate 10. The imprinting mold 11 is made by a photolithography method and has a nano-sized structures surface 12 according to a predetermined design pattern. The imprinting mold 11 is made of a silicon-based material and has a nickel coating (not shown) on the nano-sized structures surface 12.

Figure 2:
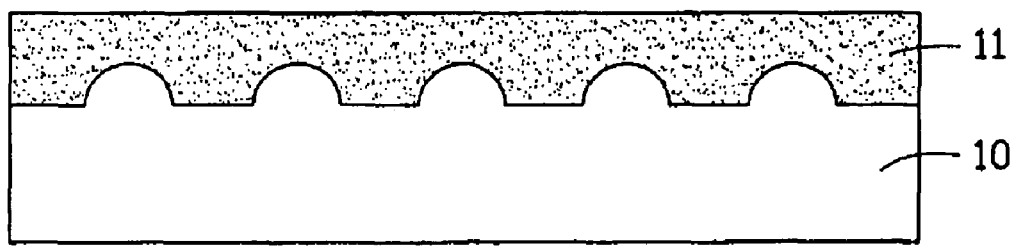
FIG. 2 is similar to FIG. 1, but showing a plurality of nano-sized structures formed on the conducting substrate using the imprinting mold.
Figure 3:
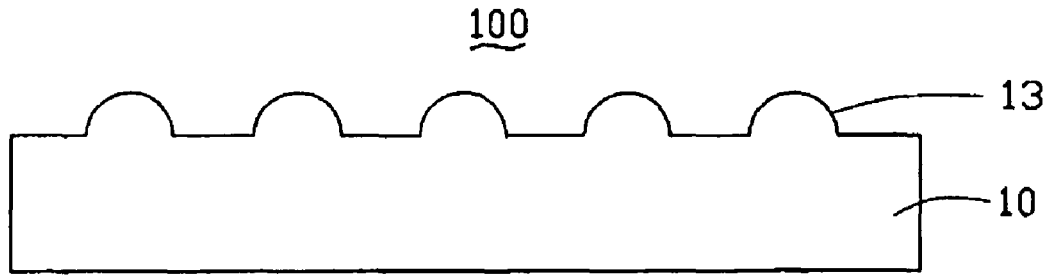
FIG. 3 is a schematic, cross-sectional view of the electrode having nano-sized structures in accordance with the preferred embodiment.

Also referring to FIG. 2 and FIG. 3, through a nano imprinting process, a plurality of nano-sized structures 13 is formed on a surface of the conducting substrate 10 using the imprinting mold 11. Nano imprinting method is one of cheapest nanolithography techniques available for laboratories, and resolutions as low as 10 nm can be reached. The principle of the nano imprinting method is an embossing of a patterned mold in a heat resistant container. The first step in nano imprinting method is to build a silicon relief mold using direct-write electron-beam equipment. That is a slow process wherein each feature is defined by rastering an electron beam across the wafer, but once the imprinting mold has been defined, it can be used to stamp out features with the same speed of the mask-based exposure process. As a result, nano imprinting methods can make nano-sized structures easily accessible for industrial applications. An electrode 100 made by a nano imprinting process is shown in FIG. 3.

Referring to FIG. 4, a coating 15 is deposited on the nano-sized structures 13 by a chemical vapor deposition method or a sputtering method. A thickness of the nano material coating 15 is in a range from 1 nanometer to 20 nanometers. Preferably, the thickness of the coating 15 is in a range from 2 nanometers to 10 nm. The coating 15 is comprised of carbon nanotubes and nano-sized particles. The nano-sized particles are selected from the group consisting of indium tin oxide, chromium oxide ($CrO_x$), cobalt oxide ($CoO_x$), nickel oxide ($NiO_x$), ferric oxide ($FeO_y$), aluminum oxide, zinc oxide ($ZnO_x$), silica oxide, titanium oxide and zirconium oxide ($ZrO_x$) wherein x is in the range from 1 to 2; and y is in the range from 1 to 1.5.

The conventional capacitors are regular oxide materials with flat surfaces and have limited capacity for electrical charges. The present invention uses nano-sized structures and a coating to increase specific surface area, so that the present electrode can store much more electrical charge.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:

1. An electrode comprising:
a conducting substrate integratedly formed with a plurality of nano-sized structures on a major surface thereof; and
a coating directly formed on both the nano-sized structures and portions of the major surface between the nano-sized structures, the coating being comprised of carbon nanotubes and nano-sized particles;
wherein the nano-sized structures are configured for increasing specific surface area of the electrode.

2. The electrode as claimed in claim 1, wherein the conducting substrate is comprised of a material selected from the group consisting of graphite, lithium, aluminum, copper, silver, nickel, tungsten, molybdenum and any suitable combination alloy thereof.

3. The electrode as claimed in claim 1, wherein the nano-sized structures are concave-shaped.

4. The electrode as claimed in claim 1, wherein the nano-sized structures are convex-shaped.

5. The electrode as claimed in claim 1, wherein a size of each nano-sized structure is in the range from 2 nanometers to 50 nanometers.

6. The electrode as claimed in claim 1, wherein a size of each nano-sized structure is in the range from 10 nanometers to 40 nanometers.

7. The electrode as claimed in claim 1, wherein the nano-sized particles are selected from the group consisting of indium tin oxide, chromium oxide, cobalt oxide, nickel oxide, ferric oxide, aluminum oxide, zinc oxide, silica oxide, titanium oxide and zirconium oxide.

8. The electrode as claimed in claim 1, wherein a thickness of the coating is in the range from 1 nanometer to 20 nanometers.

9. The electrode as claimed in claim 1, wherein a thickness of the coating is in the range from 2 nanometers to 10 nanometers.

10. The electrode as claimed in claim 1, wherein the coating is directly formed on all of the nano-sized structures and all portions of the major surface between the nano-sized structures.

11. An electrode comprising:
a conducting substrate integratedly formed with a plurality of nano-sized structures on a major surface thereof, the nano-sized structures being configured for increasing specific surface area of the electrode; and
a coating directly formed on both the nano-sized structures and portions of the major surface between the nano-sized structures, the coating being concave-shaped at regions between adjacent nano-sized structures.

12. The electrode as claimed in claim 11, wherein the coating is comprised of carbon nanotubes and nano-sized particles.

13. An electrode comprising:
a conducting substrate comprising a major surface nanoimprinted such that the conducting substrate comprises protrusive nano-sized structures at the major surface; and
a coating directly formed on the major surface including where the nano-sized structures are, the coating comprising carbon nanotubes and nano-sized particles;
wherein the nano-sized structures are configured for increasing a specific surface area of the electrode.

14. The electrode of claim 13, wherein the nano-sized structures are spaced from one another.

15. The electrode of claim 14, wherein the coating is directly formed on both the nano-sized structures and portions of the major surface between the nano-sized structures.

16. The electrode of claim 13, wherein the coating has a substantially uniform thickness.

* * * * *